United States Patent [19]
Priola et al.

[11] 3,869,276
[45] Mar. 4, 1975

[54] NOVEL INDUSTRIAL WEED CONTROL COMPOSITIONS

[75] Inventors: Michael A. Priola, Briarcliff Manor, N.Y.; Ernest C. Carver, Hazlet, N.J.

[73] Assignee: Ciba-Geigy Corporation, Ardsley, N.Y.

[22] Filed: May 1, 1972

[21] Appl. No.: 249,033

[52] U.S. Cl.................. 71/93, 71/122, 71/DIG. 1
[51] Int. Cl.............................................. A01n 9/22
[58] Field of Search................... 71/93, 22, DIG. 1

[56] References Cited
UNITED STATES PATENTS

| | | | |
|---|---|---|---|
| 3,075,834 | 1/1963 | Lehunea................................. | 71/93 |
| 3,629,257 | 12/1971 | Berrer et al............................ | 71/93 |
| 3,634,062 | 1/1972 | Berrer..................................... | 71/93 |
| 3,676,441 | 7/1972 | Nikles..................................... | 71/93 |
| 3,713,806 | 1/1973 | Priola et al............................. | 71/93 |

FOREIGN PATENTS OR APPLICATIONS
982,344  2/1965  Great Britain.................. 71/DIG. 1

*Primary Examiner*—James O. Thomas, Jr.
*Attorney, Agent, or Firm*—Harry Falber; Philip Berestecki

[57] ABSTRACT

A novel water extendible herbicidal formulation containing pentachlorophenol, 2, 4-bis(isopropylamino)-6-methoxy-s-triazine and a non-water soluble surfactant, dodecylbenzene isopropylamine sulfonate being a preferred surfactant. In an alternative embodiment of the present invention it has been discovered that certain non-water soluble surfactants are by themselves effective as herbicides.

21 Claims, No Drawings

NOVEL INDUSTRIAL WEED CONTROL COMPOSITIONS

BACKGROUND OF THE INVENTION

Industrial Weed Control is practiced in a variety of industrial areas such as along railroad right-of-ways, along highways, around petroleum refineries, power transmission right-of-ways, etc. Weed control is particularly important for railroad right-of-way maintenance programs and it is in this area that the most stringent demands are made upon industrial weed control formulations. The ballast of roadbeds and the adjoining tow path area must be kept substantially weed-free if train schedules are to be consistently met. For many years, railroads depended upon hand and mechanical methods to maintain a weed-free roadbed. Because labor coats are excessive when mechanical methods of weed control are used, railroads now employ chemical weed control programs.

Weed problems on railroad right-of-ways differ substantially from those encountered on agricultural soils. A greater variety of weed species are found, including broad-leafed weeds and grasses, annuals, biennials, and perennials. The more difficult to control of these species seem to be more prevalent on railroad right-of-ways. No single herbicide provides complete control of all weed species present. This prompted the use of combinations of two or more herbicides in nearly all railroad weed control programs by tank mixing (i.e. active ingredients are mixed together immediately prior to application) each of the herbicides required. Although tank mixes allow applicators the flexibility of using the correct herbicides for the specific weeds to be controlled, they leave a great deal to be desired. The best approach to the use of combinations in large scale railroad weed control programs is the use of single unit, especially developed combination formulations. The development and commercialization of new combination formulations designed specifically for railroad weed control programs has had a significant impact on railroad roadbed maintenance.

In railroad weed control programs, main and branch line treatments are made with liquid sprays. These sprays involve the use of a wide variety of herbicide product types, i.e., contacts, residuals, and hormones. These products are used either alone or in combination with each other. Their use in combination depends upon several factors: the specific type of spray system desired; the dominant weed species present; geographical areas to be treated and the time of application selected. These applications can be made in the fall or spring of the year, and as either pre- or post-emergence treatments. Pre-emergence treatments are made before weeds and grasses germinate and emerge from the soil; post-emergence treatments are made after the weeds and grasses germinate and emerge.

Post-emergence spray programs vary from one railroad to another, but all railroads select the specific herbicides needed, based on the dominant problem weed species present. Due to the wide range of weed species which exist, (including annual, biennial, perennial broadleafed weeds and grasses) on a geographical basis, on any one railroad's operating system, the use of more than one herbicide in most instances is required in order to obtain the desired weed control. Therefore, in most post-emergence treatments, it is not uncommon for a railroad to add three distinctly different herbicides into the same mix tank and handle the resulting mixture through the same spray system in a once-through operation. Unlike the pre-emergence programs, in post-emergence programs, it is the rule, rather than the exception, to use different types of herbicides in combination with each other and applied in the same spray operation.

In these programs, combinations usually include a contact herbicide plus a residual, a contact plus a hormone, or a hormone plus a residual, or all three; a contact, a hormone, and a residual. Combination spray mixtures are preferred and used to obtain the maximum degree of weed control at the most economical cost per acre mile. But until recently specific single unit commercial combination formulations were virtually non-existent for railroad spray programs. The use of combinations evolved simply by tank mixing the desired materials. The tank mix technique, although simple, has many serious disadvantages associated with it. In the past these drawbacks have caused serious non-performance problems and have resulted in customer complaints and dissatisfaction.

Some of the disadvantages associated with tank mixes include the following:

1. Application of poorly or improperly blended spray mixtures may result in sub-standard weed control and in some cases total nonperformance.
2. Tank mixing requires extra time and additional labor.
3. Lack of trained and capable personnel doing the actual measuring and mixing.
4. Lack of satisfactory mixing equipment and facilities.
5. Special agitation apparatus may be required.
6. Combining and mixing must be done off-track, requiring extra facilities.
7. Products being used are not compatible.
8. Although products being used are compatible, the specific formulations selected are not compatible.
9. Products are not added to the mix tank or mixed in the correct sequence.
10. One or more components in the spray mixture may separate or settle out upon standing.
11. Separated components may be difficult to redisperse.
12. Spray mixtures may have to be applied the same day they are prepared.

If the maximum degree of weed control is to be achieved at the lowest cost per acre mile, combinations of two or more herbicides are a necessary part of any good post-emergence railroad weed control program. Railroads, jobber-custom applicators, research, and sales personnel generally agree that the most efficient and most accurate use of combinations is through the use of single unit combination formulations when they are available for the specific weed problem that requires solving. These formulations contain a combination of two or more different herbicides and are designed and researched to handle specific weed problems. In addition, single unit combination formulations also offer some distinct advantages when it comes to their application. For example, they can be readily used in injection systems, and they also lend themselves to other methods including metering and mixing in motion. In some special cases, they also lend themselves to shipments in compartmented tank cars.

In the railroad weed control programs, two types of spray systems are utilized: water systems and oil systems. Water systems are used exclusively for pre-emergence residual weed control treatments and to a great degree in post-emergence treatments. In the case of pre-emergence treatments, applications usually involve a single residual herbicide in water.

Since most residual herbicides have little or no post-emergence foliage contact activity, they must be combined with a good contact agent. This is especially important when employing a water system, and when applications are made to existing, well established vegetation. Water systems designed for use in post-emergence applications, whether early or late post, include a residual type herbicide plus the addition to the tank mix of a good contact material such as pentachlorophenol, monosodium acid methane arsonate, disodium methane arsonate, sodium chlorate/sodium metaborate, sodium chlorate/calcium chloride, sodium trichloro acetate, etc.

Oil Systems are never used in pre-emergence programs. They are used exclusively for post-emergence weed control programs and involve a residual type and a contact type herbicide. in these programs, herbicidal oil, which is an excellent contact material in itself, is used at the rate of 40 to 50 gallons per acre and acts as the carrier for the residual component.

One of the disadvantages of oil systems, is that the oil is difficult to obtain. Oil companies found that they can upgrade this type of oil and sell it for other uses at a higher price. Oil is also dangerous to use. Once the steel rails of the track have been sprayed with oil, they become very slippery causing problems for the people making the applications as well as for the train crewmen, the railroad maintenance people and the trains themselves. Trains, especially heavy freights, have difficulty in starting and more importantly stopping due to the oil on the rails. Herbicidal oil sprays have an inherent drift problem associated with their use. This drift causes damage to adjacent desirable vegetation. Due to these distinct disadvantages the trend is toward greater use of water systems.

There has, until now, been no single unit combination formulation for use in water extended systems containing 2,4-bis(isopropylamino)-6-methoxy-s-triazine and there are numerous situations where such a formulation would be desirable such as where long residual control is required, where certain weed species are involved, under certain soil and climate conditions and where fall applications are desirable. There is, therefore, a need for an effective single unit water based herbicidal formulation containing both a residual and contact herbicide.

SUMMARY OF THE INVENTION

In accordance with the present invention there is provided a new water extendible herbicide that knocks down weeds as effectively as oil-carried herbicides and keeps weeds under control all season long. The new herbicide is an effective single unit water based formulation containing about 8–20 percent, preferably about 8–10 percent by weight pentachlorophenol, about 20–40 percent, preferably about 24–26 percent, by weight 2,4-bis(isopropylamino)-6-methoxy-s-triazine, and about 20–40 percent, preferably about 28–33 percent, by weight of non-water soluble surfactant. The surfactant employed preferably is herbicidally active.

A surfactant is considered to be herbicidally active for purposes of the present invention when the surfact will, when used at a concentration of about 1–4 percent volume/volume (based on volume of surfactant plus carrier such as water), produce about 70–100 percent dessication of weed foliage when applied at a rate of about 50–200 gallons of liquid (i.e., surfactant and carrier) per acre.

The herbicidal formulation of the present invention is a new single unit combination product designed for use in railroad and other industrial post-emergence weed control programs. It is a unique water extendible, concentrated, easily emulsifiable formulation, intended specifically for use in water spray systems. It contains two types of herbicides, that when used together offer many advantages over existing products. Because of its ease of handling, mixing (dilution) and application, the subject formulation eliminates many, if not all, of the disadvantages associated with tank mixes.

Applicants' formulation possesses distinct product characteristics of importance and significance. For the first time, a satisfactory water extendible, single unit combination, liquid formulation, containing two water insoluble herbicides, 2,4-bis(isopropylamino)-6-methoxy-s-triazine, a residual, and pentachlorophenol, a contact, Applicants' formulation can be applied simply by mixing with water and spraying.

For a product of its application advantages it has performance characteristics that have heretofore been unknown. It provides outstanding knockdown (burndown) when used in water spray systems for post-emergence applications, and gives full season control of both broadleafed weeds and grasses. Applicants' product also exhibits good shelf life, excellent water emulsifiability, good stability when diluted with water and acceptable flash point characteristics.

Applicants' formulation is of course combined with solvent. Suitable solvents include dipolar, aprotic organic liquids and mixtures thereof. Organic liquids with excellent solvent power for the herbicidally active ingredients of applicants' formulation particularly include those having two polar groups such as alcohol, ketone, ester and ether groups, Typical solvents include, for example, diacetone alcohol, ethanol, phenoxy ethanol, propylene glycol isobutyl ether, various carbitols such as methyl, butyl hexyl glycol ethers, propyl, isospropyl, butyl and isobutyl acetates, primary amyl and methyl amyl acetates, 2-ethylhexyl and phenyl acetate, dimethyl formamide, isobutanol, etc. Preferred solvents include propylene glycol isobutyl ether, diacetone alcohol or, isobutyl acetate. It is frequently desirable to employ solvent mixtures wherein less powerful solvents such as xylene or monochlorobenzene are employed in admixture with the above described solvents. Such solvent mixtures are less expensive and tend to enhance the fluidity of the final combination.

The amount of total solvent employed with Applicants' formulations is about 25–45 percent by weight of the formulation plus solvent solution.

Applicants' formulation may of course contain additional conventional ingredients and is compatible with a variety of commonly used contact weed killers.

Applicants' formulation is conveniently employed as a herbicide by mixing with water, preferably in amounts of about ¾ to 2½, preferably about 1 to 2 lbs. of active ingredients (i.e., solvent is not an active ingredient), per gallon of water and applying in accordance with conventional methods. Handling and application techniques are relatively simple. Applicators only add water; they don't have to alkanize the water to give the herbicide better wetting characteristics (as is the case with prior art formulations). Some agitation is desirable during spraying and this is conveniently done by mechanical agitation, recirculation, or by sparging air through the mixture of water and the herbicidal formulation.

Applicants' formulation-solvent-water system is conveniently applied to area to be treated at a rate such that about 10 — 30 lbs., preferably 20 - 30 lbs., of active ingredients are applied per acre of area to be treated.

Surfactants useful in the present invention are characterized by their limited solubility in water, i.e., not more than about 3 parts per 100 parts of water of 25°C, and their practically complete miscibility in the dipolar aprotic solvents hereinbefore described, i.e., a 50/50 volume % mixture of surfactant and solvent (propylene glycol isobutyl ether) should not contain more than about 20 percent by volume of a second liquid phase.

Useful surfactants employed in the formulations of the present invention include, for example, amine salts of dodecyl benzene sulfonic acid, alkyl polyether alcohols with organic sulfonates (e.g. Triton x-185, manufactured by the Rohm and Haas Company) and ethoxylated alkylated phenols containing 3-7 ethoxy groups and having 8-14 carbon atoms in the alkyl groups (e.g. Tergitol surfactants manufactured by the Union Carbide Company).

Particularly useful surfactants include $C_1$-$C_6$ alkyl amine salts of dodecyl benzene sulfonic acid. Preferred are the methylamine, ethylamine, n-butylamine, isobutylamine, sec-butylamine, t-butylamine, and n-propylamine salts of dodecyl benzene sulfonic acid. Dodecylbenzene isopropylamine sulfonate is a particularly preferred surfactant.

The 2,4-bis(isopropylamino)-6-methoxy-s-triazine useful in the present invention is commercially available as Prometone.

Particularly preferred formulations within the scope of this invention are:

| | | % by Weight |
|---|---|---|
| (1) | 2,4-bis(isopropylamino)-6-methoxy-s-triazine | 25.8 |
| | Pentachlorophenol | 10.3 |
| | Diacetone alcohol | 25.0 |
| | 95% Ethanol | 8.9 |
| | Dodecylbenzene isopropylamine sulfonate | 30.0 |
| | | 100.00 |
| (2) | 2,4-bis-(isopropylamino)-6-methoxy-s-triazine | 25.80 |
| | Pentachlorophenol | 10.30 |
| | Propylene glycol isobutyl ether | 30.00 |
| | Dodecylbenzene isopropylamine sulfonate | 33.90 |
| | | 100.00 |
| (3) | 2,4-bis-(isopropylamino)-6-methoxy-s-triazine | 25.80 |
| | Pentachlorophenol | 10.30 |
| | Propylene glycol isobutyl ether | 28.90 |
| | Dodecylbenzene isopropylamine sulfonate | 35.00 |
| | | 100.00 |
| (4) | 2,4-bis-(isopropylamino)-6-methoxy-s-triazine | 25.80 |
| | Pentachlorophenyl | 10.30 |
| | Propylene glycol isobutyl ether | 25.00 |
| | Monochloro benzene | 8.90 |
| | Dodecylbenzene isopropylamine sulfonate | 30.00 |
| | | 100.00 |
| (5) | 2,4-bis-(isopropylamino)-6-methoxy-s-triazine | 25.80 |
| | Pentachlorophenol | 10.30 |
| | Propylene glycol isobutyl ether | 25.00 |
| | Cyclohexanone | 8.90 |
| | Dodecylbenzene isopropylamine sulfonate | 30.00 |
| | | 100.00 |
| (6) | 2,4-bis(isopropylamino)-6-methoxy-s-triazine | 25.80 |
| | Pentachlorophenol | 10.30 |
| | Propylene glycol isobutyl ether | 25.00 |
| | Isobutyl acetate | 8.90 |
| | Dodecylbenzene isopropylamine sulfonate | 30.00 |
| | | 100.00 |
| (7) | 2,4-bis-(isopropylamino)-6-methoxy-s-triazine | 25.80 |
| | Pentachlorophenol | 10.30 |
| | Propylene glycol isobutyl ether | 25.00 |
| | Isobutanol | 8.90 |
| | Dodecylbenzene isopropylamine sulfonate | 30.00 |
| | | 100.00 |

In an alternative embodiment of the present invention it has been unexpectedly found that not only do the surfactants of the present invention enable one to prepare novel single unit water based herbicidal compositions but that such surfactants exhibit a synergistic effect and even more suprisingly that such surfactants are in and of themselves effective as herbicides when employed at application rates of about 5 to 32 lbs. of surfactant per acre, preferably of about 10 to 20 lbs. per acre. Conveniently, applications are made at rates of about 12:5, 15, 20 and 25 lbs. per acre.

Therefore in accordance with the alternative embodiment of the present invention there is provided a novel method for controlling undesirable vegetation by employing the surfactants hereinbefore described as herbicides. Of course, in view of this unexpected activity of the surfactants, they may be used in combination with a variety of herbicides, as well as insecticides, fungicides, micro-nutrient sprays and plant-growth regulators. The preferred surfactants hereinbefore described exhibit useful contact herbicidal activity, which can be characterized as having dessicant phytotoxic activity.

The surfactant when employed alone as a herbicide is generally applied in admixture with a carrier such as, conveniently, water; the ratio by weight of surfactant to water being about 1-5 parts of surfactant per 100 parts of water.

The herbicidal formulations as well as the surfactant herbicides disclosed herein are effecive against a variety of undesirable vegetation such as, for example, common mullein, purple mustard, cow's itch, johnsongrass, bouncingbet, yellow toad flax, and gumweed.

EXAMPLE I

The formulation described in Table I was prepared and field tested in a single unit system.

TABLE I (Applicants' Formulation)

| | % by Weight |
|---|---|
| 2,4-bis(isopropylamino)-6-methoxy-s-triazine | 25.8 |
| Pentachlorophenol | 10.3 |
| Diacetone alcohol | 25.0 |
| 95% Ethanol | 8.9 |
| Dodecylbenzene isopropylamine sulfonate | 30.0 |
| | 100.00 |

The field testing program was designed to compare post-emergence treatments of the new single unit water extendible combination formulation in a water system with prior art systems. The results are presented in Table II. The results given in Table II indicate that Applicants' new single unit water extendible emulsifiable formulation (i) and (j) provides overall performance equal to that of the oil based systems (e) and (f) which are successful commercial formulations but which suffer from the disadvantages hereinbefore described for oil based systems and provides superior performance to formulations of 2,4-bis(isopropylamino)-6-methoxy-s-triazine and water (g) and (h), to formulations of 2,4-bis(isopropylamino)-6-methoxy-s-triazine, water soluble surfactant and water (a) and (b), and to formulations of 2,4-bis(isopropylamino)-6-methoxy-s-triazine, water soluble surfactants, pentachlorophenol and water (c) and (d).

TABLE II

| | Treatment | Rate per Acre | Initial Rating (Knockdown) (0 – 10)* | Final Weed Control Rating (0 – 10)** |
|---|---|---|---|---|
| *** (a) | 2,4-bis(isopropylamino)-6-methoxy-s-triazine + 2.5% by weight of Octylphenoxy polyethoxy ethanol, a water soluble surfactant, + 2.5% by weight of Toximul 500, a sulfonate-nonionic blend water-soluble surfactant supplied by the Stepan Chemical Co. + Water | 10 lbs. 45 gal. | 4.5 | 7.0 |
| *** (b) | 2,4-bis-(isopropylamino)-6-methoxy-s-triazine + 2.5% by weight of Octylphenoxy polyethoxy ethanol, a water soluble surfactant, + 2.5% by weight of Toximul 500, a sulfonate-nonionic blend water-soluble surfactant supplied by the Stepan Chemical Co. + Water | 12 lbs. 44 gal. | 5.0 | 7.5 |
| *** (c) | 2,4-bis(isopropylamino)-6-methoxy-s-triazine + 2.5% by weight of Octylphenoxy polyethoxy ethanol, a water soluble surfactant, + 2.5% by weight of Toximul 500, a sulfonate-nonionic blend water-soluble surfactant supplied by the Stepan Chemical Co. + Pentachlorophenol having incorporated therein 5% by weight of Toximul 351 which is the ammonium salt of a sulfonated nonionic water soluble surfactant wherein the nonionic portion is an ethoxylated nonyl phenol and which is supplied by the Stepan Chemical Co. + Water | 10 lbs. 3 lbs. 45 gal. | 5.0 | 7.5 |
| *** (d) | 2,4-bis(isopropylamino)-6-methoxy-s-triazine +2.5% by weight of Octylphenoxy polyethoxy ethanol, a water soluble surfactant, + 2.5% by weight of Toximul 500, a sulfonate-nonionic blend water-soluble surfactant supplied by the Stepan Chemical Co. + Pentachlorophenol having incorporated therein 5% by weight of Toximul 351 which is the ammonium salt of a sulfonated nonionic water soluble surfactant wherein the nonionic portion is an ethoxylated nonyl phenol and which is supplied by the Stepan Chemical Co. + Water | 12 lbs. 3 lbs. 44 gal. | 5.5 | 7.5 |
| *** (e) | 2,4-bis(isopropylamino-6-methoxy-s-triazine + Pentachlorophenol + Herbicidal Oil which is aliphatic fuel oil | 10 lbs. 3 lbs. 45 gal. | 9.0 | 8.5 |
| *** (f) | 2,4-bis(isopropylamino)-6-methoxy-s-triazine + Pentachlorophenol + Herbicidal Oil which is aliphatic fuel oil | 12 lbs. 3 lbs. 44 gal. | 9.5 | 9.0 |
| *** (g) | 2,4-bis(isopropylamino)-6-methoxy-s-triazine + Water | 10 lbs. 45 gal. | 4.0 | 6.5 |
| *** (h) | 2,4-bis(isopropylamino)-6-methoxy-s-triazine + Water | 12 lbs. 45 gal. | 5.0 | 7.5 |
| (i) | 2,4-bis(isopropylamino)-6-methoxy-s-triazine, Pentachlorophenol, Diacetone alcohol, 95% Ethanol, Dodecylbenzene isopropylamine sulfonate + Water | 5 gal. Sol. containing 10 lbs. of the triazine, 4 lbs. PCP, and 12.5 lbs. sulfonate 45 gal. | 8.8 | 9.0 |

TABLE II-Continued

| Treatment | | Rate per Acre | Initial Rating (Knockdown) (0 – 10)* | Final Weed Control Rating (0 – 10)** |
|---|---|---|---|---|
| (j) | 2,4-bis(isopropylamino)-6-methoxy-s-triazine, Pentachlorophenol, Diacetone alcohol, 95% Ethanol, Dodecylbenzene isopropylamine sulfonate + | 6 gal. sol. containing 12 lbs. triazine, 4.8 lbs. PCP and 15 lbs. sulfonate | 9.5 | 9.5 |
| | Water | 44 gal. | | |

\*\*\* Outside the scope of the present invention and presented for comparison only (all require tank mixing)
\* 0 = no control 10 = 100% control
\*\* Final ratings were made 90 days after application As for initial burndown activity, in the case of the triazine compound in oil systems, complete burndown of all vegetation is obtained within 48 hours after application. This extremely quick kill effect is produced by the application of 40 to 50 gallons of herbicidal oil in combination with 3.2 pounds of PCP per acre. In the case of Applicants' formulation in a water system, initial burndown is noted 12–24 hours after application, with complete burndown of all vegetation accurring approximately one week after application. The 4 to 5 days difference in total burndown time is not significant since the overall objective of complete knockdown is achieved within an acceptable time period. As additional time elapses, overall performance of the triazine compound — oil systems and Applicants' formulation — water system treatments are equal. This is true when vegetation and individual plants are inspected and rated 30 and 90 days after application.

There is no doubt that the surfactant contained in Applicants' formula plays a significant role in the performance of this product.

It should be pointed out that the surfactant component of conventional formulations normally only serves as part of the carrier for the active ingredients; also that the surfactant part of the formulation on a percent weight basis, usually runs 5 to 10 percent by weight of the total formulation.

In the case of Applicants' formulation, the surfactant portion has been increased up to at least about 20 percent by weight of the total formulation. In this particular formulation the surfactant not only acts in the normal sense, as one of the component carriers for the two herbicide active ingredients, but also acts and performs as a specific agent in that its particular chemical and physical properties enhance the overall biological effects of the total formulations's activity, in excess of that which has been experienced in the past with formulations containing surfactants at 5 to 10% weight of the total formulation.

EXAMPLE II

In order to demonstrate the herbicidal activity of Applicants' non-water soluble surfactants, green house tests were conducted on a variety of weeds. In these tests herbicidal surfactant-water mixtures were applied so that the application of the mixture to the leaf surfaces was such that 50 gallons of mixture were applied per acre. The results are summarized below in Table III.

TABLE III

| Treatment | Rate**** Units | Application Method | Average***** Rating | Weed |
|---|---|---|---|---|
| dodecylbenzene isospropylamine sulfonate | 0.50% V/V | post, over the top | 2.0 | Prickly Sida |
| dodecylbenzene isopropylamine sulfonate | 2.00% V/V | post, over the top | 2.2 | Prickly Sida |
| dodecylbenzene isopropylamine sulfonate | 4.00% V/V | post, over the top | 7.7 | Prickly Sida |
| dodecylbenzene isopropylamine sulfonate | 0.50% V/V | post, over the top | 2.0 | Sicklepod |
| dodecylbenzene isopropylamine sulfonate | 2.00% V/V | post, over the top | 5.5 | Sicklepod |
| dodecylbenzene isopropylamine sulfonate | 4.00% V/V | post, over the top | 8.5 | Sicklepod |
| dodecylbenzene isopropylamine sulfonate | 0.50% V/V | post, over the top | 1.0 | Nutsedge |
| dodecylbenzene isopropylamine sulfonate | 2.00% V/V | post, over the top | 2.7 | Nutsedge |
| dodecylbenzene isopropylamine | 4.00% V/V | post, over the top | 3.0 | Nutsedge |

TABLE III — Continued

| Treatment | Rate**** Units | Application Method | Average***** Rating | Weed |
| --- | --- | --- | --- | --- |
| sulfonate dodecylbenzene isopropylamine sulfonate | 0.50% V/V | post, over the top | 1.0 | Morning Glory |
| dodecylbenzene isopropylamine sulfonate | 2.00% V/V | post, over the top | 2.7 | Morning Glory |
| dodecylbenzene isopropylamine sulfonate | 4.00% V/V | post, over the top | 5.5 | Morning Glory |
| dodecylbenzene isopropylamine sulfonate | 0.50% V/V | post, over the top | 1.0 | Johnsongrass |
| dodecylbenzene isopropylamine sulfonate | 2.00% V/V | post, over the top | 2.5 | Johnsongrass |
| dodecylbenzene isopropylamine sulfonate | 4.00% V/V | post, over the top | 8.0 | Johnsongrass |

**** The rate is expressed as the % surfactant by volume of the total volume of liquid used per acre.
***** Rating scale use:
1 = no effect
9 = complete kill In addition to being effective alone as herbicidal agents, the non-water soluble surfactants of the subject invention frequently exhibit a synergistic effect when combined with conventional herbicides such as 2,4-bis(isopropylamino)-6-methoxy-s-triazine, 2,4-bis(isopropylamino)-6-methylthio-s-triazine, 1,1-dimethyl-3-(alpha,alpha,alpha-trifluoro-m-tolyl)urea, 2-sec-butylamino-4-ethylamino-6-methoxy-s-triazine, 2-chloro-4-(ethylamino)-6-(isopropylamino)-s-triazine, 2-chloro-4,6-bis(ethylamino)-s-triazine, 2-(ethylamino)-4-(isopropylamino)-6-methylthio-s-triazine, 2-methylthio-4-ethylamino-6-tert-butylamino-s-triazine, 2-(4-chloro-6-ethylamino-s-triazine-2-ylamino)-2-methylpropionitrile, 5-bromo-3-sec-butyl-6-methyluracil, 3-(3,4-dichlorophenyl)-1,1-dimethylurea, 3-(p-chlorophenyl)-1,1-dimethylurea, 3-tert-butyl-5-chloro-6-methyluracil, and m-(3,3-dimethylureido) phenyl-tert-butyl-carbamate. Preferred combinations of this type include those wherein the conventional herbicide is 2,4-bis(isopropylamino)-6-methoxy-s-triazine, 2-chloro-4-(ethylamino)-6-(isopropylamino)-s-triazine, or 2-chloro-4,6-bis(ethylamino)-s-triazine for industrial and railroad weed control; 2,4-bis(isopropylamino)-6-(methylthio)-s-triazine, 1,1-dimethyl-3-(alpha,alpha,alpha-trifluoro-m-tolyl)urea for weed control in cotton; 2-chloro-4-(ethylamino)-6-(isopropylamino)-s-triazine, 2-chloro-4,6-bis(ethylamino-s-triazine, or 2(ethylamino)-4-(isopropylamino)-6-(methylthio)-s-triazine for weed control in corn, sorghum, and sugarcane; (2 -methylthio-4-ethylamino-6-tert butylamino-s-triazine) for weed control in wheat, corn, sugarcane and in industrial applications.

These combinations can contain conventional ingredients such as emulsifiable concentrates, wettable powders and flowables.

Such synergistic combinations preferably contain surfactant in an amount of about 20–40 percent, preferably 28–33 percent, by weight of total active ingredients, 60–80 percent, preferably 67–72 percent, conventional herbicides, and are conveniently mixed with solvents of the type hereinbefore described and water. Solvent is generally employed in an amount of about 30–40 percent by weight of solution and such solutions are generally mixed with water in an amount such that the water mixture contains about ¾ to 2 ½ lbs., preferably 1–2 lbs., of active ingredients per gallon. Application is generally made at a rate such that about 10–30 lbs., preferably 25 lbs., of active ingredients are employed per acre treated.

We claim:

1. A liquid herbicidal formulation consisting essentially of (a) about 8–20 percent by weight pentachlorophenol, (b) about 20–40 percent by weight 2,4-bis(isopropylamino)-6-methoxy-s-triazine, and (c) about 20–40 percent by weight of a non-water soluble surfactant, in admixture with a dipolar, aprotic, organic solvent.

2. The formulation of claim 1 containing about 8 – 10 percent by weight pentachlorophenol, (b) about 24 – 26 percent by weight 2,4-bis(isopropylamino)-6-methoxy-s-triazine, and (c) about 28 – 33 percent by weight of a non-water soluble surfactant.

3. The composition of claim 1 wherein the solvent is ethanol, phenoxy ethanol, propylene glycol isobutyl ether, a carbitol, isobutyl acetate, dimethyl formamide, diacetone alcohol or isobutanol.

4. The composition of claim 1 wherein the amount of solvent employed is about 25 – 45 percent by weight.

5. The composition of claim 1 wherein the non-water soluble surfactant is an amine salt of dodecyl benzene sulfonic acid, an ethoxylated alkylated phenol containing about 3–7 ethoxy groups and having about 8–14 carbon atoms in the alkyl groups, or an alkylpolyether alcohol with organic sulfonates.

6. The formulation of claim 1 wherein the surfactant is dodecyl benzene n-butylamine sulfonate, dodecyl benzene isobutylamine sulfonate, dodecyl benzene sec-butylamine sulfonate, dodecyl benzene t-butylamine sulfonate, dodecyl benzene isopropylamine sulfonate, dodecyl benzene methylamine sulfonate or dodecyl benzene ethylamine sulfonate.

7. The composition of claim 1 wherein the surfactant is dodecyl benzene isopropylamine sulfonate.

8. A composition of claim 1 selected from the group consisting of (a) a composition consisting essentially of about 25 percent by weight 2,4-bis-(isopropylamino)-6-methoxy-s-triazine, about 10 percent by weight pentachlorophenol, about 30 percent by weight propylene glycol isobutyl ether, and about 35 percent by weight dodecylbenzene isopropylamine sulfonate, (b) a composition consisting essentially of about 25 percent by weight 2,4-bis-(isopropylamino)-6-methoxy-s-triazine, about 10 percent by weight pentachlorophenol, about 25 percent by weight propylene glycol isobutyl ether, about 10 percent by weight monochloro benzene, and about 30 percent by weight dodecylbenzene isopropylamine sulfonate, (c) a composition consisting essentially of about 25 percent by weight 2,4-bis-(isopropylamino)-6-methoxy-s-triazine, about 10 percent by weight pentachlorophenol, about 25 percent by weight propylene glycol isobutyl ether, about 10 percent by weight cyclohexanone, and about 30 percent by weight dodecylbenzene isopropylamine sulfonate, (d) a composition consisting essentially of about 25 percent by weight 2,4-bis-(isopropylamino)-6-methoxy-s-triazine, about 10 percent by weight pentachlorophenol, about 25 percent by weight propylene glycol isobutyl ether, about 10 percent by weight isobutyl acetate, about 30 percent by weight dodecylbenzene isopropylamine sulfonate, (e) a composition consisting essentially of about 25 percent by weight 2,4-bis-(isopropylamino) -6-methoxy-s-triazine, about 10 percent by weight pentachlorophenol, about 25 percent by weight propylene glycol isobutyl ether, about 10 percent by weight isobutanol, and about 30 percent by weight dodecylbenzene isopropylamine sulfonate, and (f) a composition consisting essentially of about 25 percent by weight of 2,4-bis-(isopropylamino)-6-methoxy-s-triazine, about 10% by weight pentachlorophenol, about 25 percent by weight diacetone alcohol, about 10 percent by weight of 95 percent ethanol and about 30% by weight of dodecylbenzene isopropylamine sulfonate.

9. The formulation of claim 1 in admixture with water wherein the mixture contains about ¾ to 2 ½ lbs. of active ingredients per gallon.

10. A method for combatting undesired vegetation wherein there is applied to the area wherein the effect is desired a herbicidally effective amount of the composition of claim 1 in admixture with water wherein the mixture contains about ¾ to 2 ½ lbs. of active ingredients per gallon.

11. A method for combatting undesired vegetation wherein there is applied to the area wherein the effect is desired a herbicidally effective amount of the composition of claim 3 in admixture with water wherein the mixture contains about ¾ to 2½ lbs. of active ingredients per gallon.

12. A method for combatting undesired vegetation wherein there is applied to the area wherein the effect is desired a herbicidally effective amount of the composition of claim 4 in admixture with water wherein the mixture contains about ¾ to 2½ lbs. of active ingredients per gallon.

13. A method for combatting undesired vegetation wherein there is applied to the area wherein the effect is desired a herbicidally effective amount of the composition of claim 5 in admixture with water wherein the mixture contains about ¾ to 2 ½ lbs. of active ingredients per gallon.

14. A method for combatting undesired vegetation wherein there is applied to the area wherein the effect is desired a herbicidally effective amount of the composition of claim 6 in admixture with water wherein the mixture contains about ¾ to 2½ lbs. of active ingredients per gallon.

15. A method for combatting undesired vegetation wherein there is applied to the area wherein the effect is desired a herbicidally effective amount of the composition of claim 7 in admixture with water wherein the mixture contains about ¾ to 2½ lbs. of active ingredients per gallon.

16. A method for combatting undesired vegetation wherein there is applied to the area wherein the effect is desired a herbicidally effective amount of the composition of claim 8 in admixture with water wherein the mixture contains about ¾ to 2½ lbs. of active ingredients per gallong.

17. The method of claim 10 wherein the mixture is applied at a rate such that about 10–30 lbs. of active ingredients are applied per acre.

18. A method for combatting undesired vegetation wherein there is applied to the area wherein the effect is desired a herbicidally effective amount of a non-water soluble surfactant which is an amine salt of dodecyl benzene sulfonate, an ethoxylated alkylated phenol containing about 3–7 ethoxy groups and having about 8–14 carbon atoms in the alkyl groups, or an alkylpolyether alcohol mixed with organic sulfonates.

19. The method of claim 18 wherein the surfactant is employed at a rate of about 5 to 32 lbs. per acre.

20. The method of claim 18 where the herbicidally effective non-water soluble surfactant is dodecyl benzene n-butylamine sulfonate, dodecyl benzene isobutylamine sulfonate, dodecyl benzene sec-butylamine sulfonate, dodecyl benzene t-butylamine sulfonate, dodecyl benzene isopropylamine sulfonate, dodecyl benzene methylamine sulfonate, or dodecyl benzene ethylamine sulfonate.

21. The method of claim 18 wherein dodecyl benzene isopropylamine sulfonate is employed as the herbicidally effective non-water soluble surfactant.

* * * * *